United States Patent
Damnjanovic et al.

(10) Patent No.: US 11,843,981 B2
(45) Date of Patent: Dec. 12, 2023

(54) PRIMARY CELL (PCELL) SELECTION IN MOBILITY ACTIVE SET MANAGEMENT

(71) Applicant: QUALCOMM Incorporated, San Diego, CA (US)

(72) Inventors: Jelena Damnjanovic, Del Mar, CA (US); Tao Luo, San Diego, CA (US); Junyi Li, Fairless Hills, PA (US); Olufunmilola Omolade Awoniyi-Oteri, San Diego, CA (US); Aleksandar Damnjanovic, Del Mar, CA (US); Ozcan Ozturk, San Diego, CA (US); Iyab Issam Sakhnini, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 17/325,981

(22) Filed: May 20, 2021

(65) Prior Publication Data
US 2021/0385702 A1     Dec. 9, 2021

Related U.S. Application Data

(60) Provisional application No. 63/036,333, filed on Jun. 8, 2020, provisional application No. 63/036,362, filed on Jun. 8, 2020.

(51) Int. Cl.
*H04W 36/00*     (2009.01)
*H04W 36/08*     (2009.01)
*H04W 72/21*     (2023.01)

(52) U.S. Cl.
CPC ... *H04W 36/0061* (2013.01); *H04W 36/0066* (2013.01); *H04W 36/08* (2013.01); *H04W 72/21* (2023.01)

(58) Field of Classification Search
CPC .................................................. H04W 72/0413
See application file for complete search history.

(56) References Cited

U.S. PATENT DOCUMENTS

| | | | |
|---|---|---|---|
| 10,728,947 B2 * | 7/2020 | Teyeb | H04W 80/08 |
| 2015/0223241 A1 * | 8/2015 | Cattoni | H04L 5/0044 370/329 |
| 2017/0055242 A1 * | 2/2017 | Kusashima | H04L 27/2607 |

(Continued)

*Primary Examiner* — Shukri Taha
(74) *Attorney, Agent, or Firm* — Patterson & Sheridan, L.L.P/Qualcomm Incorporated

(57) ABSTRACT

Aspects of the present disclosure relate to wireless communications, and more particularly, to mobility techniques that allow for dynamically updating a set of cells activated to serve a user equipment (UE) and the cell in the set of cells designated as the primary cell (PCell). An example method includes receiving signaling indicating a set of cells supported by one or more distributed units (DUs) under a common central unit (CU); identifying a subset of the set of cells activated to serve the UE, wherein a first cell of the activated cells comprises a primary cell selected from cells included in a candidate set of primary cells (PCells); and identifying another one of the activated cells to serve as the PCell if the first cell is re-designated as a secondary cell (SCell), wherein the other one of the activated cells comprises a cell selected from the candidate set of PCells.

30 Claims, 16 Drawing Sheets

(56) References Cited

U.S. PATENT DOCUMENTS

| | | | |
|---|---|---|---|
| 2017/0230160 A1* | 8/2017 | Li | H04W 52/0229 |
| 2019/0349822 A1* | 11/2019 | Kim | H04W 36/0069 |
| 2021/0204309 A1* | 7/2021 | Babaei | H04W 72/20 |
| 2021/0204344 A1* | 7/2021 | Babaei | H04W 72/1263 |
| 2021/0307102 A1* | 9/2021 | Babaei | H04W 36/0058 |

* cited by examiner

PRIMARY CELL (PCELL) SELECTION IN MOBILITY ACTIVE SET MANAGEMENT

CROSS-REFERENCE TO RELATED APPLICATIONS

This application claims benefit to U.S. Provisional Patent Application Ser. No. 63/036,362, entitled "Primary Cell (PCell) Selection in Mobility Active Set Management," filed on Jun. 8, 2020; and U.S. Provisional Patent Application Serial No. 63/036,333, entitled "Control Resources in Mobility Active Set Management," filed on Jun. 8, 2020, both of which are assigned to the assignee hereof and are hereby incorporated by reference in their entirety.

TECHNICAL FIELD

Aspects of the present disclosure relate to wireless communications, and more particularly, to mobility techniques that allow for dynamically updating a set of cells activated and a primary cell (PCell) in the set of cells to serve a user equipment (UE).

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication by a user equipment (UE). The method generally includes receiving signaling indicating a set of cells supported by one or more distributed units (DUs) under a common central unit (CU), identifying a subset of the set of cells activated to serve the UE, wherein a first cell of the activated cells is designated as a primary cell (PCell), and identifying another one of the activated cells to serve as a PCell if the first cell is de-activated.

One innovative aspect of the subject matter described in this disclosure can be implemented in a method for wireless communication by a network entity. The method generally includes transmitting, to a user equipment (UE), signaling indicating a set of cells supported by one or more distributed units (DUs) under a common central unit (CU), communicating with the UE via a subset of the cells that are activated for serving the UE, wherein a first cell of the activated cells is designated as a primary cell (PCell), and identifying another one of the activated cells to serve as a PCell if the first cell is de-activated.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to mobility techniques that allow for dynamically updating a set of cells activated to serve a user equipment (UE) and a cell designated as a primary cell (PCell) to serve the UE. As will be described in greater detail below, the set of activated cells may be updated based on physical (PHY) layer (Layer1 or L1) or medium access control (MAC) layer (Layer2 or L2) signaling that indicates one or more cells to activate and/or de-activate.

The following description provides examples of dynamically updating a set of cells activated to serve a UE and a cell designated as a PCell to serve the UE via physical layer (PHY) or medium access control (MAC) layer signaling, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
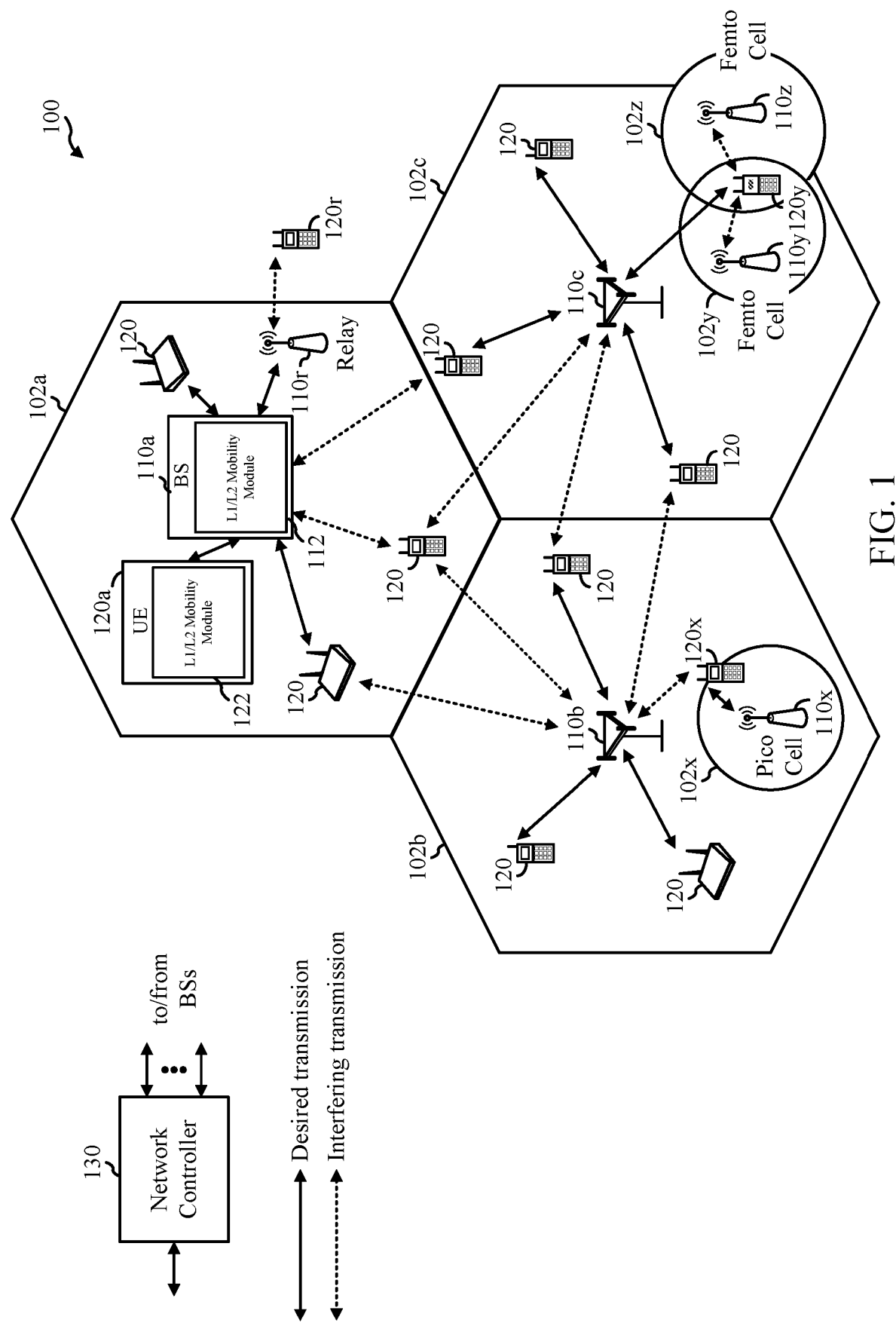
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include an L1/L2 mobility module 122 that may be configured to perform (or cause UE 120a to perform) operations 800 of FIG. 8 or operations 1100 of FIG. 11. Similarly, a BS 120a may include an L1/L2 mobility module 112 that may be configured to perform (or cause BS 110a to perform) operations 900 of FIG. 9 or operations 1200 of FIG. 12.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
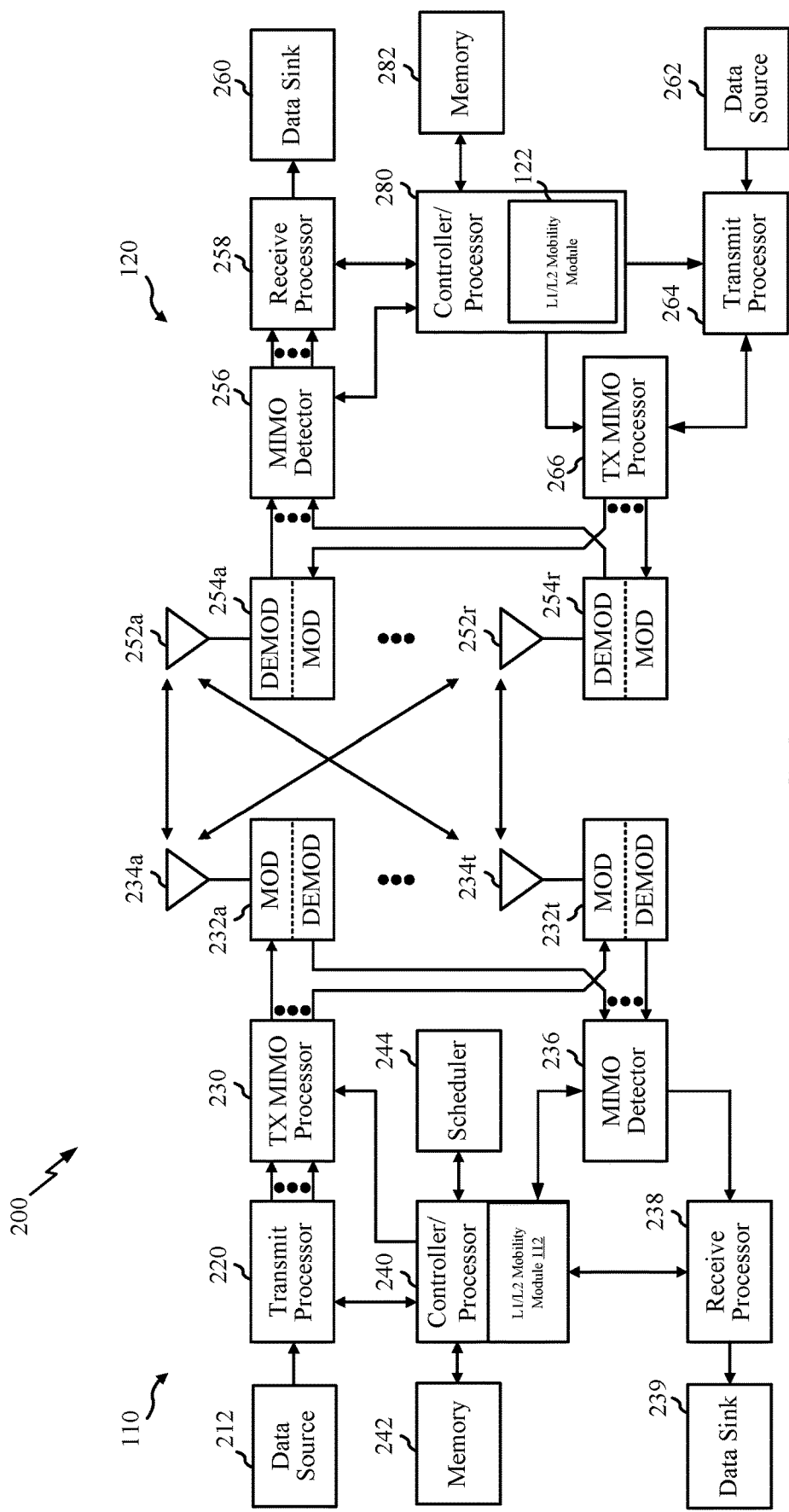
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has an L1/L2 mobility module 122 that may be configured to perform (or cause UE 120 to perform) operations 800 of FIG. 8. Similarly, the BS 120a may include an L1/L2 mobility module 112 that may be configured to perform (or cause BS 110a to perform) operations 900 of FIG. 9.

Figure 3A:
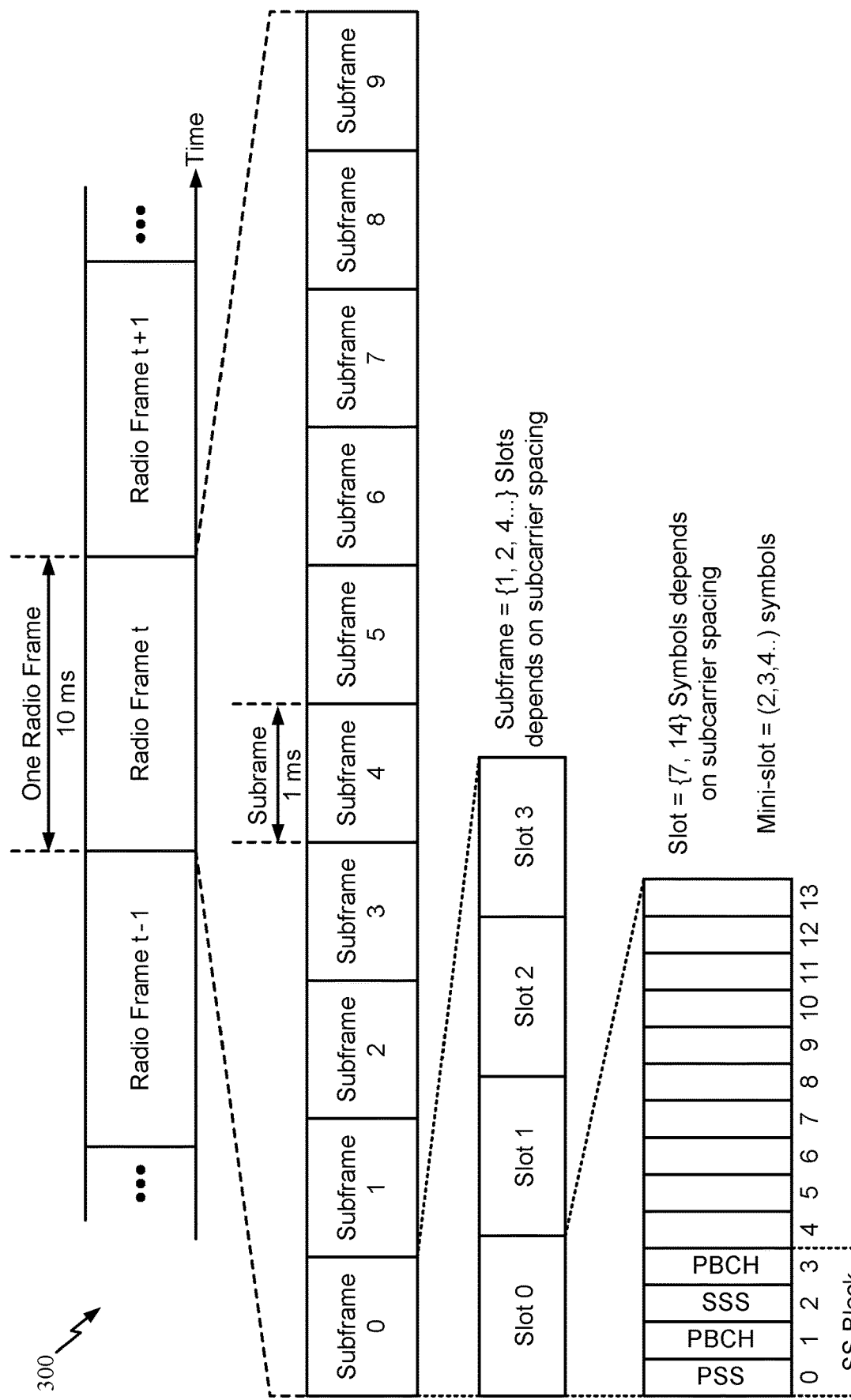
FIG. 3A illustrates an example of a frame format for a telecommunication system.

FIG. 3A is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIGs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Figure 3B:
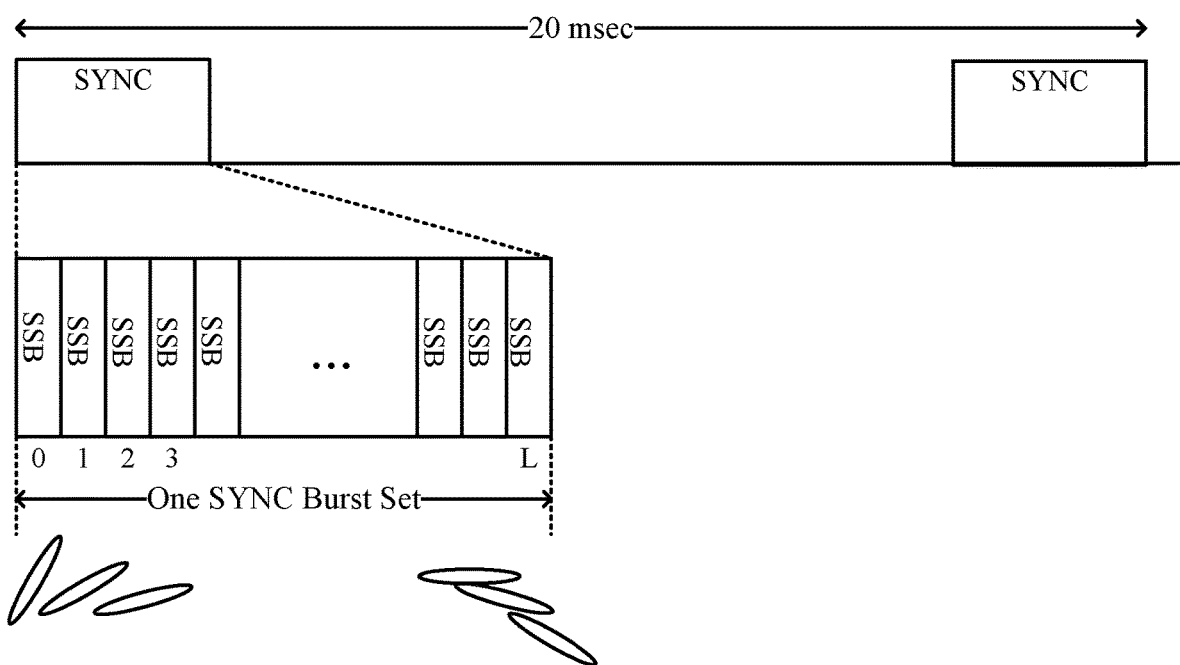
FIG. 3B illustrates how different synchronization signal blocks (SSBs) may be sent using different beams.

As shown in FIG. 3B, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for L1/L2 Mobility Active Set Management

Aspects of the present disclosure relate to wireless communications, and more particularly, to mobility techniques that allow for dynamically updating a set of cells activated to serve a user equipment (UE) and a cell designated as the primary cell (PCell) for serving the UE. As will be described in greater detail below, the set of activated cells and the cell designated as the PCell may be updated based on physical (PHY) layer (Layer1 or L1) or medium access control (MAC) layer (Layer2 or L2) signaling that indicates one or more cells to activate and/or de-activate.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec.

In multi-beam operation (e.g., involving FR1 and FR2 bands), more efficient uplink/downlink beam management may allow for increased intra-cell and inter-cell mobility (e.g., L1 and/or L2-centric mobility) and/or a larger number of transmission configuration indicator (TCI) states. For example, the states may include the use of a common beam for data and control transmission and reception for UL and DL operations, a unified TCI framework for UL and DL beam indication, and enhanced signaling mechanisms to improve latency and efficiency (e.g., dynamic usage of control signaling).

The techniques presented herein provide signaling mechanisms that may help support such enhanced features, improve latency, and improve efficiency with more usage of dynamic control signaling. For example, the techniques described herein make use of physical layer (PHY, Layer1, or L1) or medium access control (MAC, Layer2 or L2) signaling, as opposed to higher layer (e.g., RRC) signaling.

Figure 4:
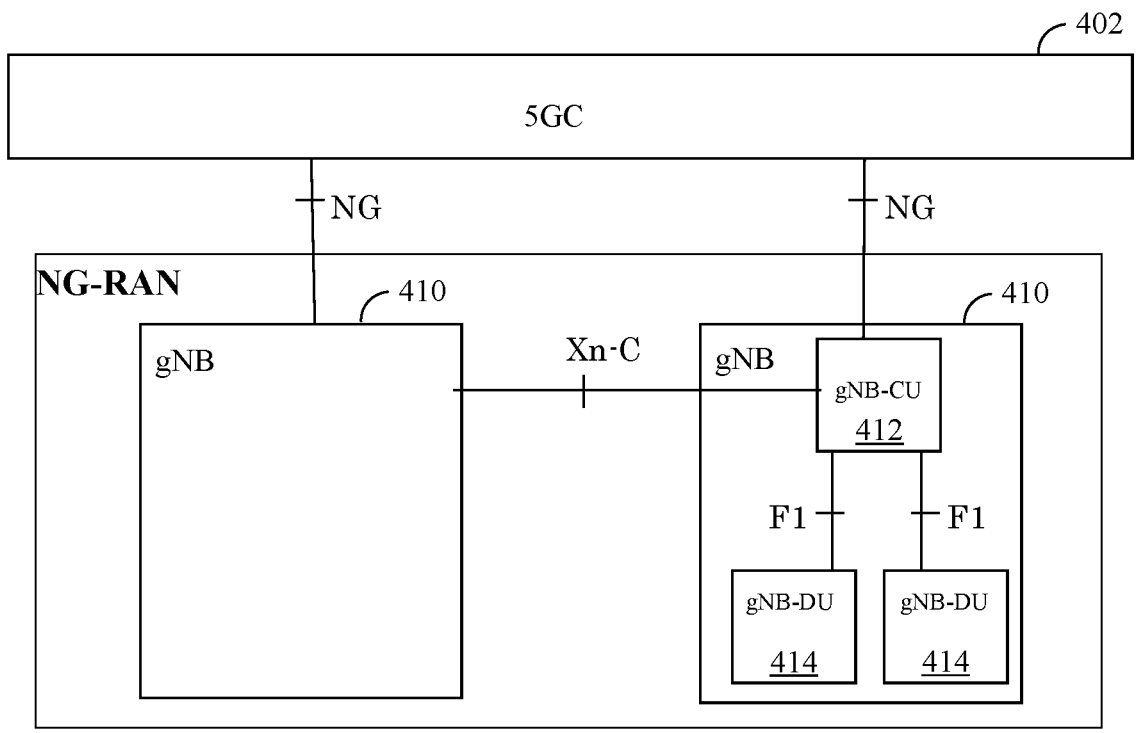
FIG. 4 illustrates an example architecture in which aspects of the present disclosure may be practiced.

FIG. 4 illustrates an example architecture 400 in which aspects of the present disclosure may be practiced. As illustrated, the architecture 400 includes a plurality of gNBs 410 operating in a radio access network. Each gNB 410 may be connected to a 5GC core network 402 and may include a gNB Central Unit (gNB-CU) 412. The gNB-CU 412 generally serves as a logical node hosting RRC, Service Data Adaptation Protocol (SDAP) and PDCP protocols of the gNB 410 that controls the operation of one or more gNB distributed units (gNB-DUs) 414. As illustrated, the gNB-CU terminates an F1 interface connected with the gNB-DU.

Figure 5:
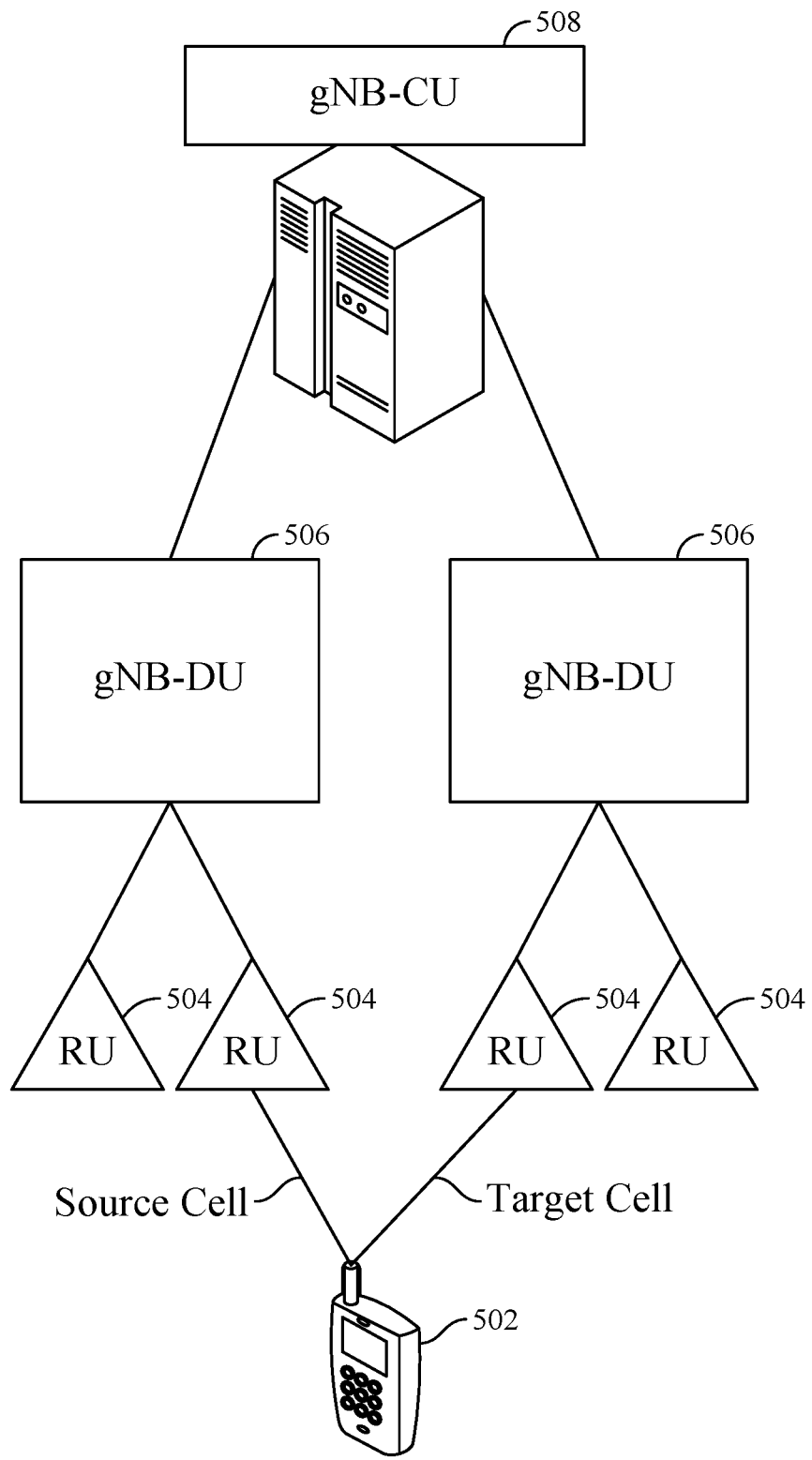
FIGS. 5 and 6 illustrate example scenarios in which aspects of the present disclosure may be practiced.
Figure 6:
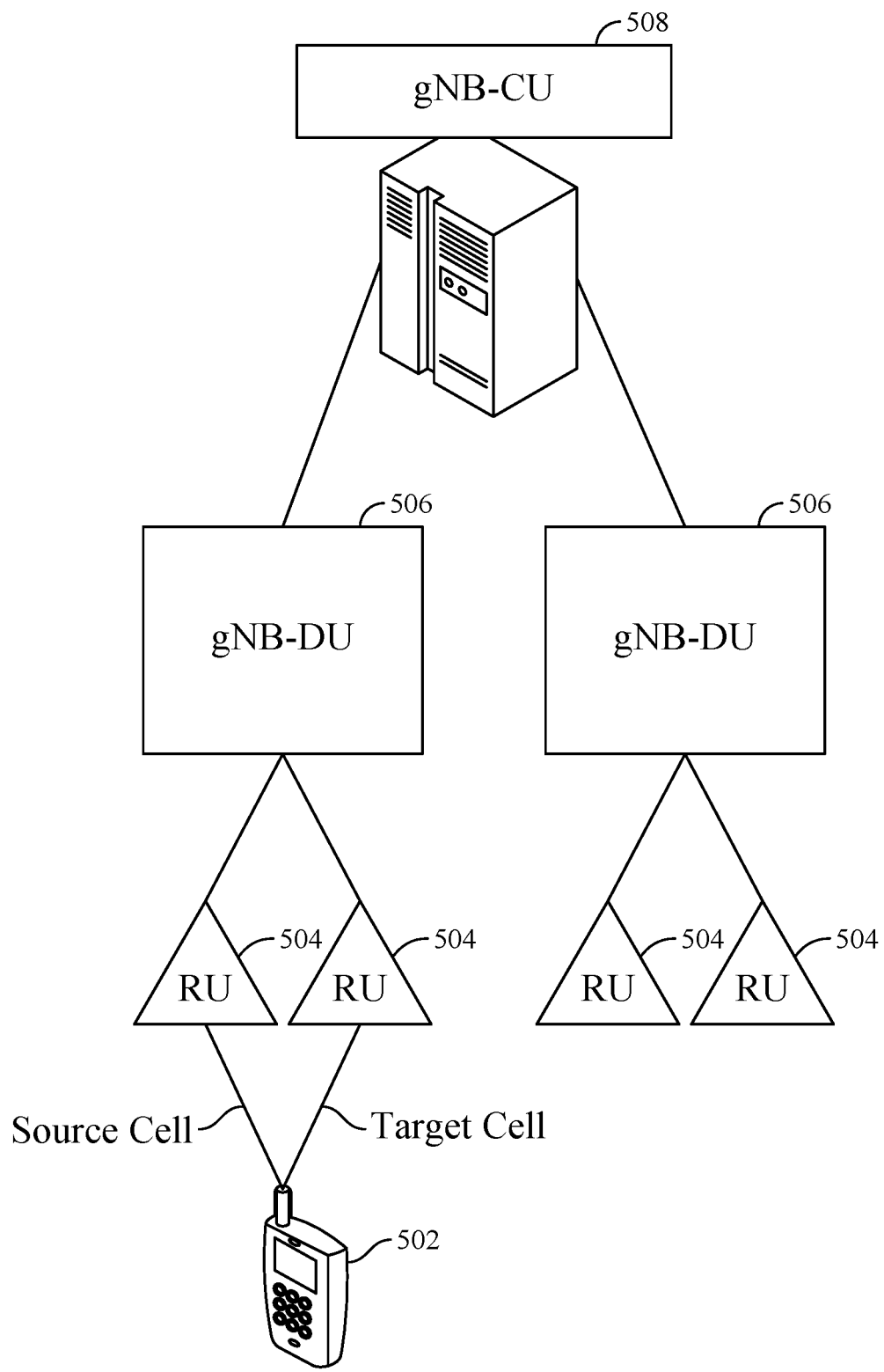

A gNB-DU 414 generally serves as a logical node hosting RLC, MAC and PHY layers of the gNB 410, and its operation is controlled by gNB-CU 412. As illustrated in FIGS. 5 and 6, one gNB-DU 414 supports one or multiple cells; however, each cell is supported by only one gNB-DU 414. The gNB-DU 414 terminates the F 1 interface connected with the gNB-CU 412.

FIGS. 5 and 6 illustrate example scenarios in which aspects of the present disclosure may be practiced.

As illustrated in FIG. 5, in some cases, a UE 502 may be handed over between (source and target) cells supported by radio units, or RUs, 504 of different DUs 506 under the same CU 508. The RUs 504 generally contain only PHY layer logic. In the scenario illustrated in FIG. 5, the cells could have non-collocated (in different DUs) PHY, MAC, and RLC logic, but common PDCP and RRC logic (the same CU). While L1/L2 signaling techniques described herein may be used for mobility, the data path from PDCP to different RLCs present some control aspects that may be addressed by coordination between DUs.

In the scenario illustrated in FIG. 6, on the other hand, source and target cells are supported by (belong to) the same DU. Thus, L1/L2 mobility may be particularly attractive in this scenario, as the cells can share MAC and upper layers (same DU). In this scenario, when performing a handover via L1/L2 signaling, the data path at MAC and above stays the same.

As noted above, the distributed RUs contain only PHY layer and may be used (activated/de-activated) in a similar manner to carrier aggregation (CA), but cells may be on the same carrier frequencies. As such, aspects of the present disclosure, however, may utilize mechanisms similar to those used in CA to enable L1/L1 mobility (e.g., activating/de-activating cells).

FIG. 7 illustrates an example of UE mobility, in accordance with certain aspects of the present disclosure.

As noted above, as an initial step, RRC signaling may be used to configure a set of cells 702 for L1/L2 mobility. The example of FIG. 7A assumes a configured set of 8 cells (Cells1-8). In general, the cell set may be designed to be large enough to cover meaningful mobility (e.g., anticipated mobility of a UE within a given area and given time). As will be described below, mobility management may be performed by activating/de-activating cells in the set.

Figure 7A:
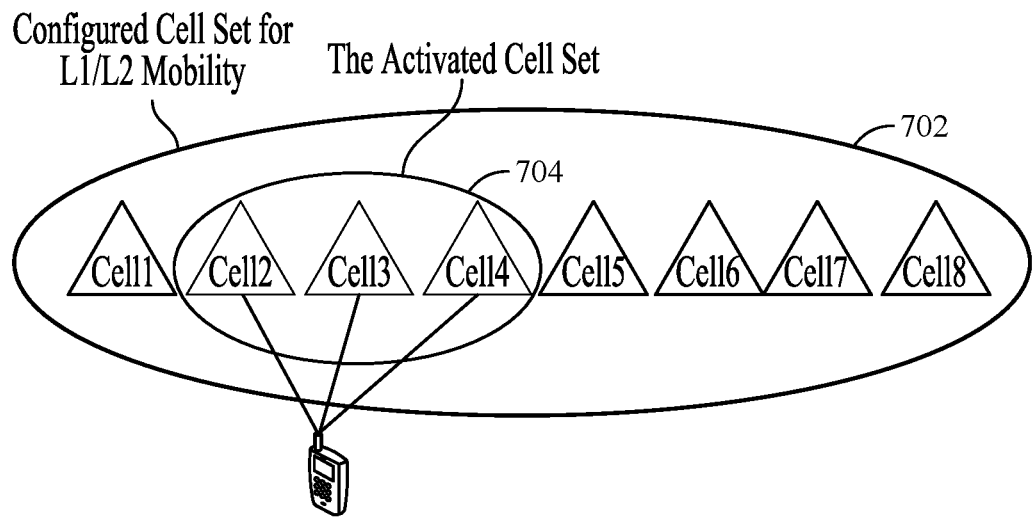
FIGS. 7A and 7B illustrate an example of UE mobility, in accordance with some aspects of the present disclosure.

From the configured set of cells 702, at any given time, a certain set of cells 704 may be activated. This activated cell set 704 generally refers to a group of cells in the configured set that are activated. Referring again to FIG. 7A, the activated cell set 704 includes Cells 2-4. Which cells are activated for any given UE may depend on UE reported measurements. Configured cells that are not activated (a deactivated cell set) may include the (remaining) group of cells in in the configured set 702 that are deactivated (not activated). In FIG. 7A, the deactivated cell set includes Cell 1 and Cells5-8.

Aspects of the present disclosure may provide for seamless mobility within the activated cells in the activated cell set. In some cases, the signaling mechanism may be relatively similar to beam management. For example, mobility management within the activated set may be performed through L1/L2 signaling used to activate/deactivate cells in the activated and deactivated cell sets to select beams within the activated cells.

Figure 7B:
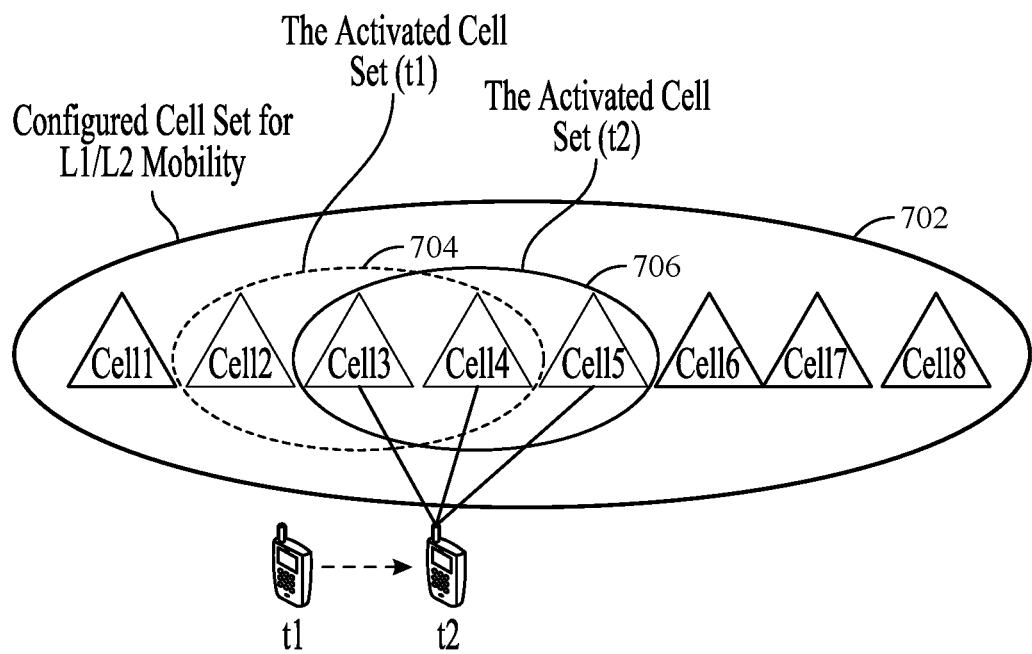

As illustrated in FIG. 7B, as the UE moves, cells from the configured set of cells 702 are deactivated and activated, for example, based on signal quality (measurements reported by the UE) and other considerations (e.g., loading of the cells). In the example shown in FIG. 7B, as the UE moves from left (at time t1) to right (at time t2), cell 5 (which is now closer) is activated and cell 2 (which is now farther) is deactivated. Thus, after the move, the new activated cell set 706 includes Cell3, Cell4, and Cell5, in contrast to the previous activated cell set 704 which includes Cell2, Cell3, and Cell4.

The cells that are activated/deactivated by L1/L2 signaling may be based on network control, UE recommendation, or UE decision. In general, the L1/L2 signaling (e.g., DCI and/or MAC-CEs) could carry activation and/or deactivation commands (e.g., that indicate cells to be activated and cells to be deactivated).

If a UE is capable of supporting only one activated cell at a time, an activation command indicating a new cell could implicitly deactivate a currently active cell (e.g. upon UE acknowledging the command).

In some aspects, one of the cells in the activated cell set may be designated as a primary cell (PCell), and other cells in the activated cell set may be designated as secondary cells (SCells). Generally, a PCell may facilitate a connection to the network. For example, the UE may transmit, to the PCell, signaling on the physical uplink control channel (PUCCH). The PCell may transmit the random access channel (RACH) for the UE to monitor in connecting to the network. The PCell may also handle radio link management (RLM) and radio link failure (RLF) events with the UE, among other functions for facilitating a connection between the UE and the network.

Generally, a first cell in the activated cell set may be designated as the PCell, and the other cells in the activated cell set may be designated as SCells. Over time, as the UE moves or as channel conditions change, cells may be added and removed from the activated cell set. A cell added to the activated cell set may become the PCell, and the first cell (which previously served as the PCell) may be redesignated as an SCell. For example, when the first cell designated as the PCell is to be deactivated from the activated cell set, another cell may be designated as the PCell, and the first cell may be designated as an SCell and removed from the activated cell set, as discussed in further detail below. By designating another cell as the PCell and re-designating the first cell as an SCell, the activated cell set may include a PCell regardless of whether a cell previously designated as the PCell is to be removed from the activated cell set.

Figure 8:
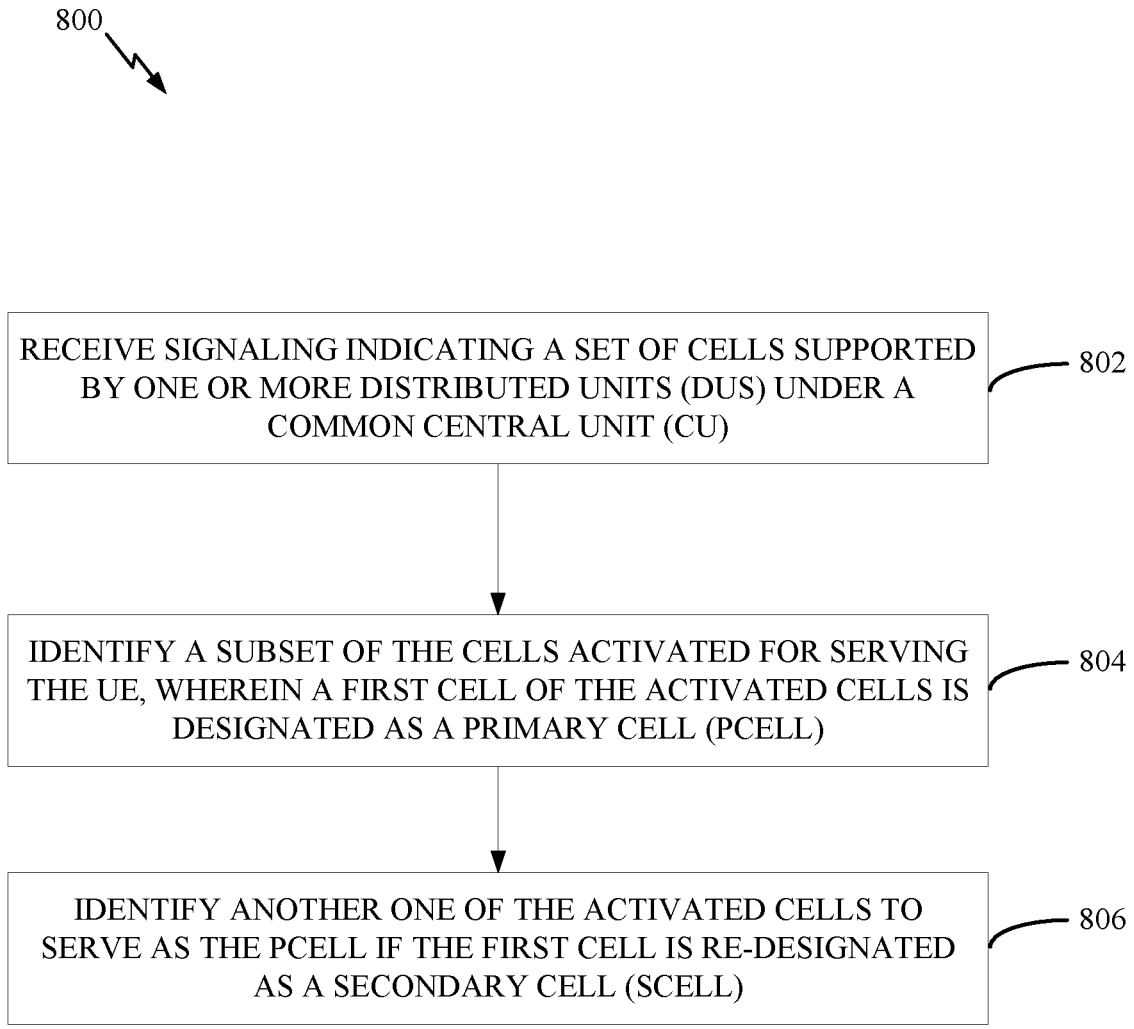
FIG. 8 illustrates example operations for wireless communication by a user equipment (UE), in accordance with some aspects of the present disclosure.

FIG. 8 illustrates example operations 800 that may be performed by a UE to identify a PCell to be used in an activated set of cells in L1/L2-based mobility, in accordance with certain aspects of the present disclosure. Operations 800 may be performed, for example, by a UE 120 illustrated in FIG. 1.

Operations 800 begin, at 802, where the UE receives signaling indicating a set of cells supported by one or more distributed units (DUs) under a common central unit (CU). For example, the UE may receiving RRC signaling indicating a set of cells that support L1/L2 mobility. In some aspects, the RRC signaling may indicate which cells in the set of cells are candidate primary cells (PCells), or cells that can serve as a primary cell for the UE (e.g., cells that can facilitate a UE connection to a network, as discussed above).

At 804, the UE identifies a subset of the set of cells activated to serve the UE. A first cell of the activated cells may be one of the cells designated as a candidate PCell, and that cell may serve the UE as the PCell.

Figure 10A:
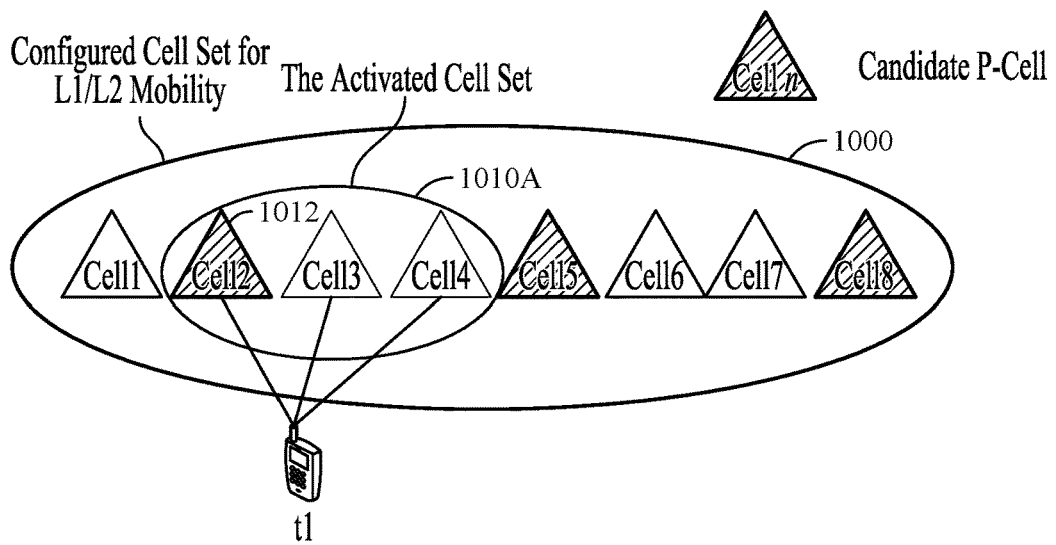
FIGS. 10A-10C illustrate an example of UE mobility and selection of a primary cell (PCell) during mobility, in accordance with some aspects of the present disclosure.
Figure 10B:
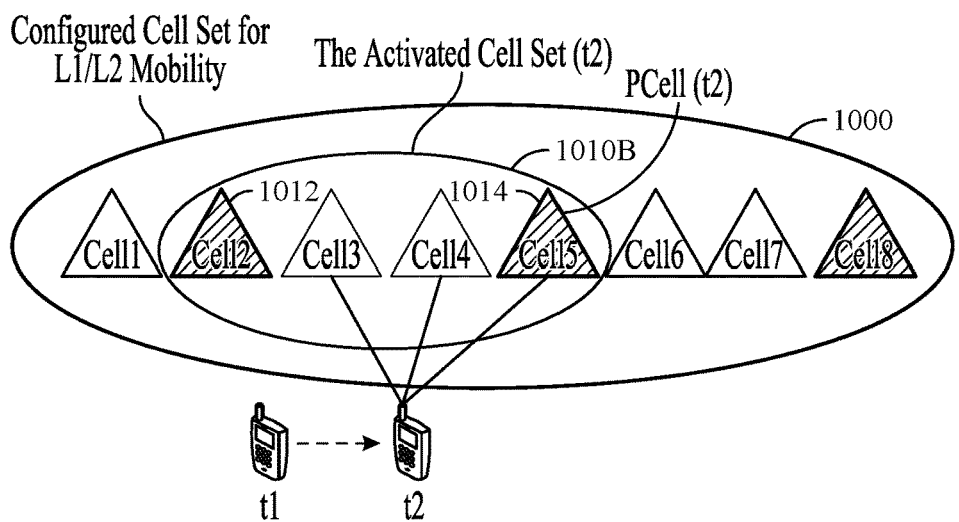
Figure 10C:
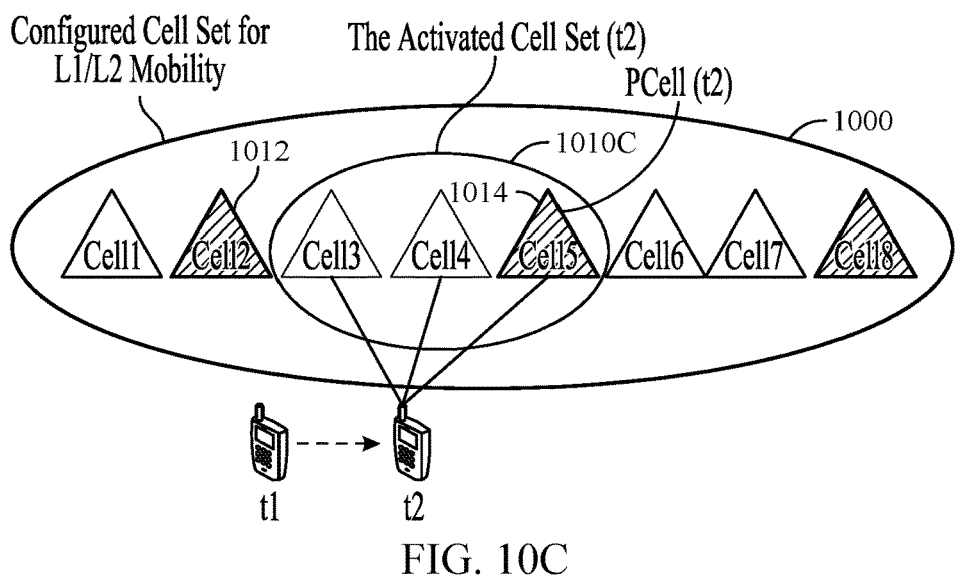

At 806, the UE identifies another one of the activated cells to serve as the PCell if the first cell is de-activated based on physical (PHY) or medium access control (MAC) layer signaling. FIGS. 10A-10C, described in greater detail below, illustrate how a UE may update an activated cell set and the selection of the PCell in the activated cell set based on L1/L2 signaling.

Figure 9:
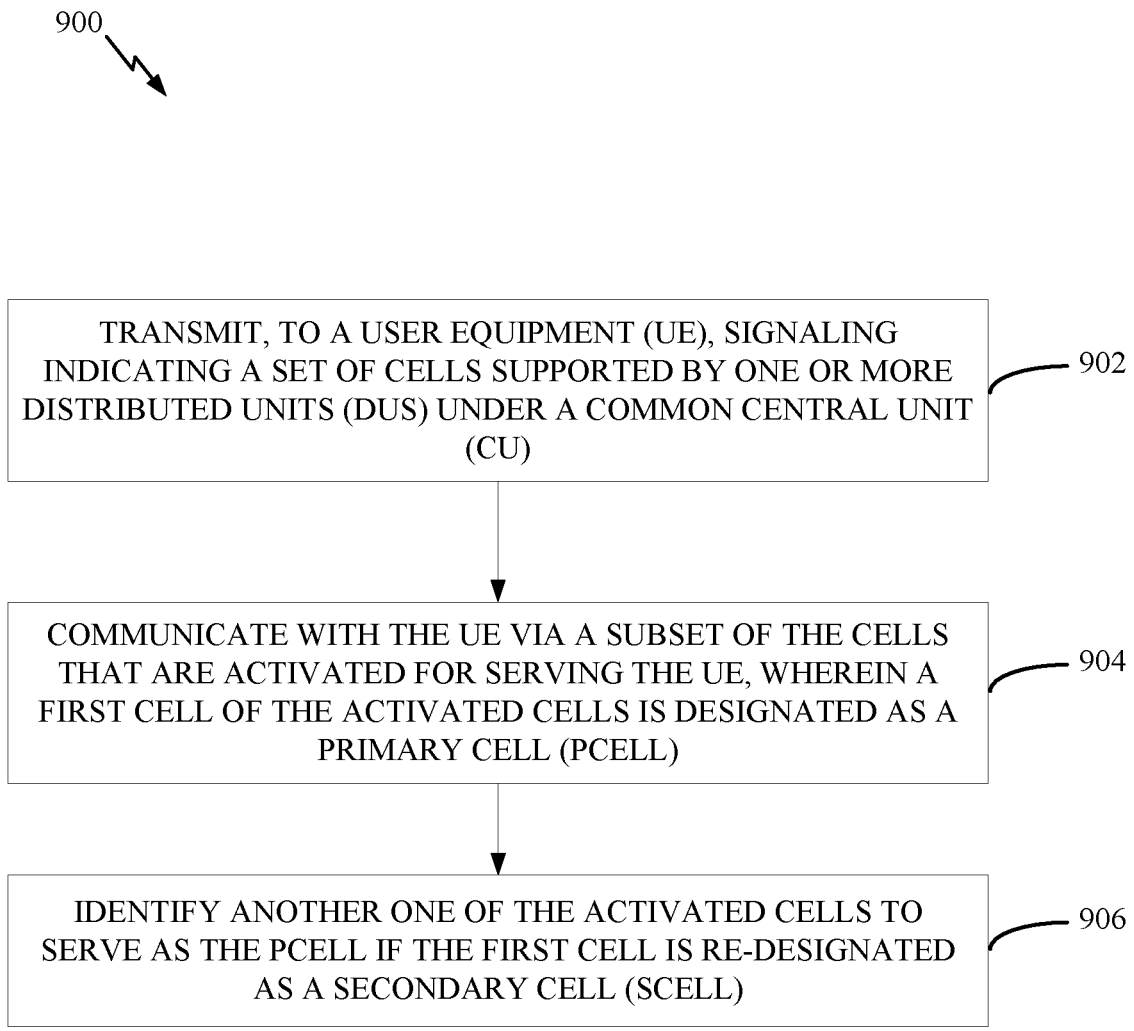
FIG. 9 illustrates example operations for wireless communication by a network entity, in accordance with some aspects of the present disclosure.

FIG. 9 illustrates example operations 900 that may considered complementary to operations 800 of FIG. 8. For example, operations 900 may be performed by a network entity (e.g., a gNB DU/CU) to dynamically activate cells to support mobility of a UE (performing operations 800 of FIG. 8).

Operations 900 begin, at 902, where the network entity transmits, to a user equipment (UE), an indication of a set of cells supported by one or more distributed units (DUs) under a common central unit (CU).

At 904, the network entity communicates with the UE via a subset of the cells that are activated for serving the UE. A first cell of the activated cells may be designated as a primary cell (PCell).

At 906, the network entity identifies another one of the activated cells to serve as the PCell if the first cell is de-activated based on physical (PHY) or medium access control (MAC) layer signaling.

Generally, if a first cell designated as the PCell is to be re-designated as an SCell (e.g., the UE moves into a position such that another cell can better serve the UE as the PCell than the first cell) or deactivated (e.g., the UE moves into a position such that the activated cell set should no longer include the first cell), another cell in the activated cell set may be selected or otherwise designated as the PCell. Once the other cell in the activated cell set is selected or otherwise designated as the PCell, the first cell may be removed from the activated cell set. In some aspects, the preconfigured parameters specific to PCell functionality may be activated via physical (PHY) layer or medium access control (MAC) layer signaling.

In some aspects, the UE may be configured with information identifying cells supported by one or more DUs under a common CU that may serve as a PCell. The information identifying cells supported by one or more DUs under a common CU that may serve as a PCell may be received by the UE, for example, in radio resource control (RRC) signaling.

Selection and reselection of a PCell (e.g., changing the cell designated as the PCell from a first cell to another cell) may be performed by a network entity. For example, a UE may periodically or aperiodically transmit measurement reports to a network entity for at least some of the cells in the set of cells supported by one or more DUs under a common CU. Based on the reported measurements, the network entity can determine when a cell designated as a PCell is to be de-activated (e.g., when a measurement for that cell falls below a threshold value, which may be defined a priori), identify a new PCell for the UE, and signal the change in the cell designated as the PCell to the UE via PHY layer or MAC layer signaling. In some aspects, the network entity can consider various data points in identifying the PCell to select for the activated cell set. For example, the network entity can consider cell loading, channel quality, and/or other information in identifying the PCell to select for the activated cell set.

In some aspects, the UE may autonomously identify a cell to be designated as the PCell. For example, and as discussed above, a UE may be preconfigured with a set of candidate cells that may be designated as a PCell. For each cell in the set of candidate cells, the UE may perform channel quality measurements and select the candidate cell having the highest channel quality measurement as the PCell. The selection of the candidate cell may be signaled to the network entity implicitly or explicitly (e.g., via PHY or MAC layer signaling).

Operations 800 and 900 of FIGS. 8 and 9 may be described with reference to FIGS. 10A-10C which illustrate an example of UE mobility and selection of a PCell during UE mobility.

As illustrated in FIG. 10A, in some cases, a UE may be provided with information identifying a set of activated cells 1010A in a configured cell set 1000 and a subset of the cells from which a PCell may be selected (referred to as a candidate PCell set). The subset of the cells from which the PCell may be selected may include all of the cells supported by one or more DUs under a common CU or may include a preconfigured subset of the cells supported by the one or more DUs under the common CU. The preconfigured subset of cells supported by the one or more DUs under the common CU that can be selected as a PCell may be configured by the network entity (e.g., gNodeB). Information about the preconfigured subset of cells that can be selected as the PCell may be provided to the UE via radio resource control signaling (RRC) or in physical (PHY) or medium access control (MAC) layer (e.g., L1 or L2) signaling. In the example illustrated in FIGS. 10A-10C, the candidate PCell set may include cells Cell2, Cell5, and Cell8.

As illustrated in FIG. 10A, at time t1, Cell2 1012 may be designated as the PCell and be included in the set of activated cells 1010A, and deactivated cells Cell5 and Cell8 may be deactivated but may remain candidate PCells that the UE can designate as the PCell when a cell designated as the current PCell is to be deactivated.

As illustrated in FIG. 10B, the UE moves to a new location at time t2. In moving to the new location at time t2, the UE and/or network entity may determine that Cell2 1012 is to be deactivated. Because Cell2 1012 currently serves as the PCell in the set of activated cells 1010A, de-activating Cell2 1012 may be performed after another cell is designated as the PCell and Cell2 1012 is designated as an SCell (e.g., after PCell functionality is transferred from Cell 2 1012 to another cell in the set of cells). In this case, Cell5 1014 may be activated, resulting in a temporarily enlarged set of activated cells 1010B. Because Cell5 1014 is included in the candidate PCell set, the UE and/or network entity may determine that Cell5 1014 can serve as the PCell. For example, the UE may autonomously designate Cell5 1014 as the new primary cell based on channel measurements for each cell included in the a priori defined subset of cells that can be selected as the PCell. Thus, Cell5 1014 may be designated as the PCell (e.g., autonomously by the UE or by the network entity), and Cell2 1012 may be designated as the SCell, and parameters specific to PCell functionality for Cell5 1014 may be activated by the network entity (e.g., via PHY layer signaling or MAC layer signaling).

After Cell2 1012 is designated as an SCell and PCell functionality is transferred to Cell5 1014, Cell2 1012 may be removed from the subset of cells activated for serving the UE. As illustrated in FIG. 10C, the activated set of cells 1010C for serving the UE may include Cell3, Cell4, and Cell5, with Cell5 being designated the PCell in the activated set of cells 1010C for serving the UE. Cell2 and Cell8 may be in the set of deactivated cells, but may remain candidate PCells for when the currently designated PCell is to be removed from the subset of cells activated for serving the UE.

In some aspects, each cell in the set of cells may be self-sufficient. In such a case, each cell may specify, to the UE, its own control resources and other control information. An anchor cell for the network connection for the UE may be defined, and a designation of the anchor cell may change as cells are activated and de-activated.

In some aspects, the network entity can use PHY or MAC layer signaling to set the PCell from the preconfigured subset of cells supported by the one or more DUs under the common CU that can be selected as the PCell. In such a case, the PHY or MAC layer signaling may explicitly identify the cell to be designated as the PCell. In response, the UE may designate its current PCell as an SCell and may designate the identified cell as the PCell. The previous PCell, now designated as an SCell, may, but need not be, removed from the activated set of cells, as discussed above.

In some aspects, the network entity may communicate, to the UE, information identifying cells that the UE can autonomously designate as a PCell. The cells that the UE can autonomously designate as a PCell may be a subset of the preconfigured subset of cells that can be selected as the PCell. As discussed, the UE can designate one of these cells as the PCell (e.g., based on channel measurements). When the UE selects one of these cells as a PCell, the UE may transmit signaling to the network entity identifying the selected cell as the PCell.

In some aspects, a first cell in the activated cell set may carry control information for the other cells in the activated cell set. For example, the first cell may be a cell designated as a PCell and included in a set of candidate PCells, and other cells in the activated cell set may be designated as secondary cells (SCells). In some aspects, the first cell may facilitate a connection to the network (e.g., handle the physical uplink control channel (PUCCH), perform cross-cell scheduling, handle default bandwidth part (BWP) selection, handle random access channel (RACH) resources, etc.). When the first cell is to be deactivated from the activated cell set, another cell may be designated as the cell that carries control information for the other cells in the activated cell set. The control mapping may be transferred from the first cell to the other cell, and the first cell may be deactivated, as discussed in further detail below. By transferring the control mapping from the first cell to the other cell, continuity in communications may be realized in L1/L2-based mobility. While the carrying of control information is discussed with respect to a PCell, it should be recognized by one of ordinary skill in the art that any cell in an activated cell set may carry control information for the other cells in the activated cell set.

Figure 11:
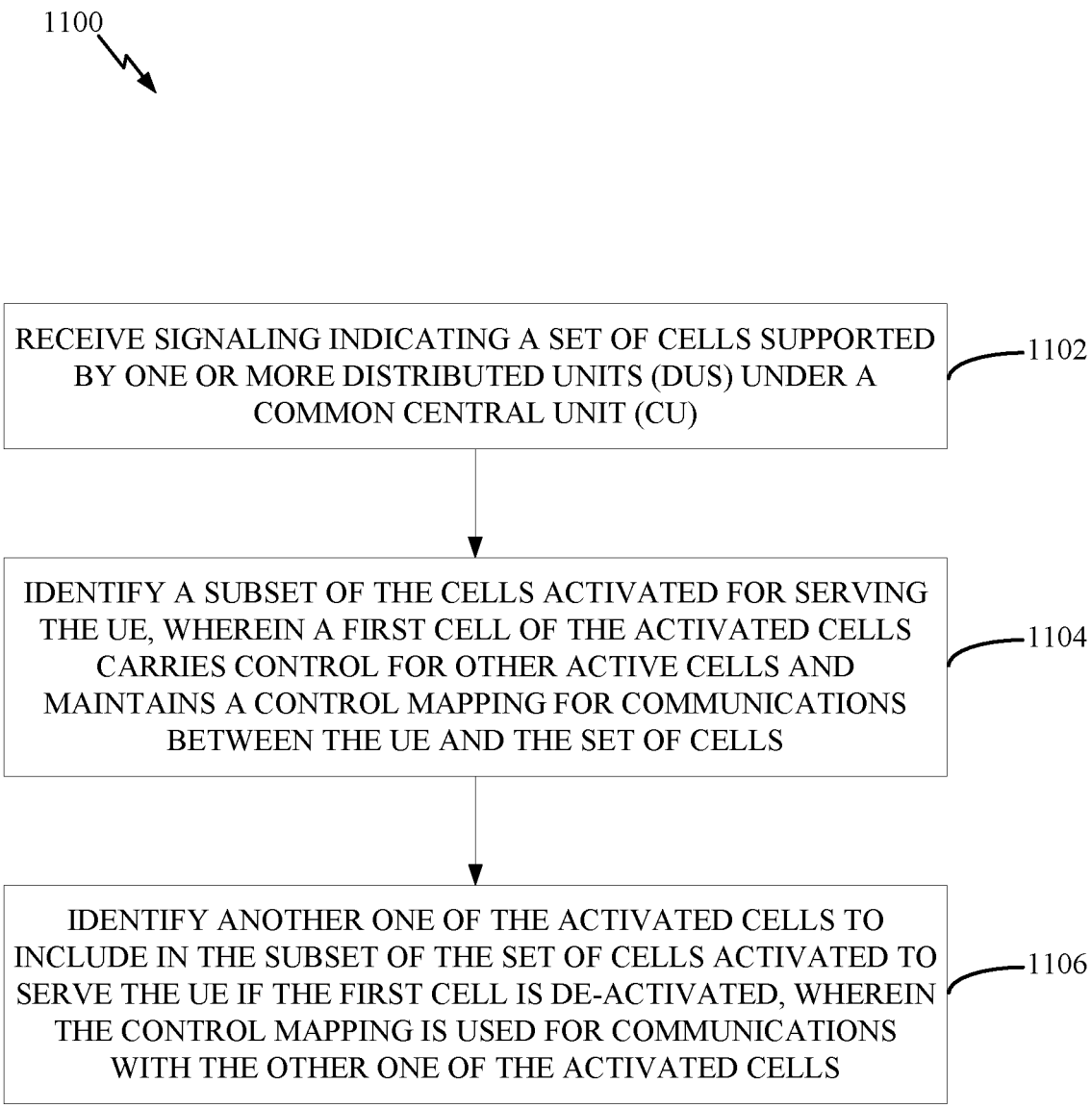
FIG. 11 illustrates example operations for wireless communication by a user equipment (UE), in accordance with some aspects of the present disclosure.

FIG. 11 illustrates example operations 1100 that may be performed by a UE to transfer control mappings between cells in an activated set of cells in L1/L2-based mobility, in accordance with certain aspects of the present disclosure. Operations 1100 may be performed, for example, by a UE 120 illustrated in FIG. 1.

Operations 1100 begin, at 1102, where the UE receives signaling indicating a set of cells supported by one or more distributed units (DUs) under a common central unit (CU). For example, the UE may receiving RRC signaling indicating a set of cells that support L1/L2 mobility.

At 1104, the UE identifies a subset of the set of cells activated to serve the UE. A first cell of the activated cells may carry control for other active cells and may maintain a control mapping for communications between the UE and the set of cells.

At 1106, the UE identifies another one of the activated cells to serve as the PCell if the first cell is de-activated. The control mapping may be used for communications with the other one of the activated cells illustrated in FIGS. 13A-13B, described in greater detail below, illustrate how a UE may update an activated cell set and the selection of the PCell in the activated cell set based on L1/L2 signaling.

Figure 12:
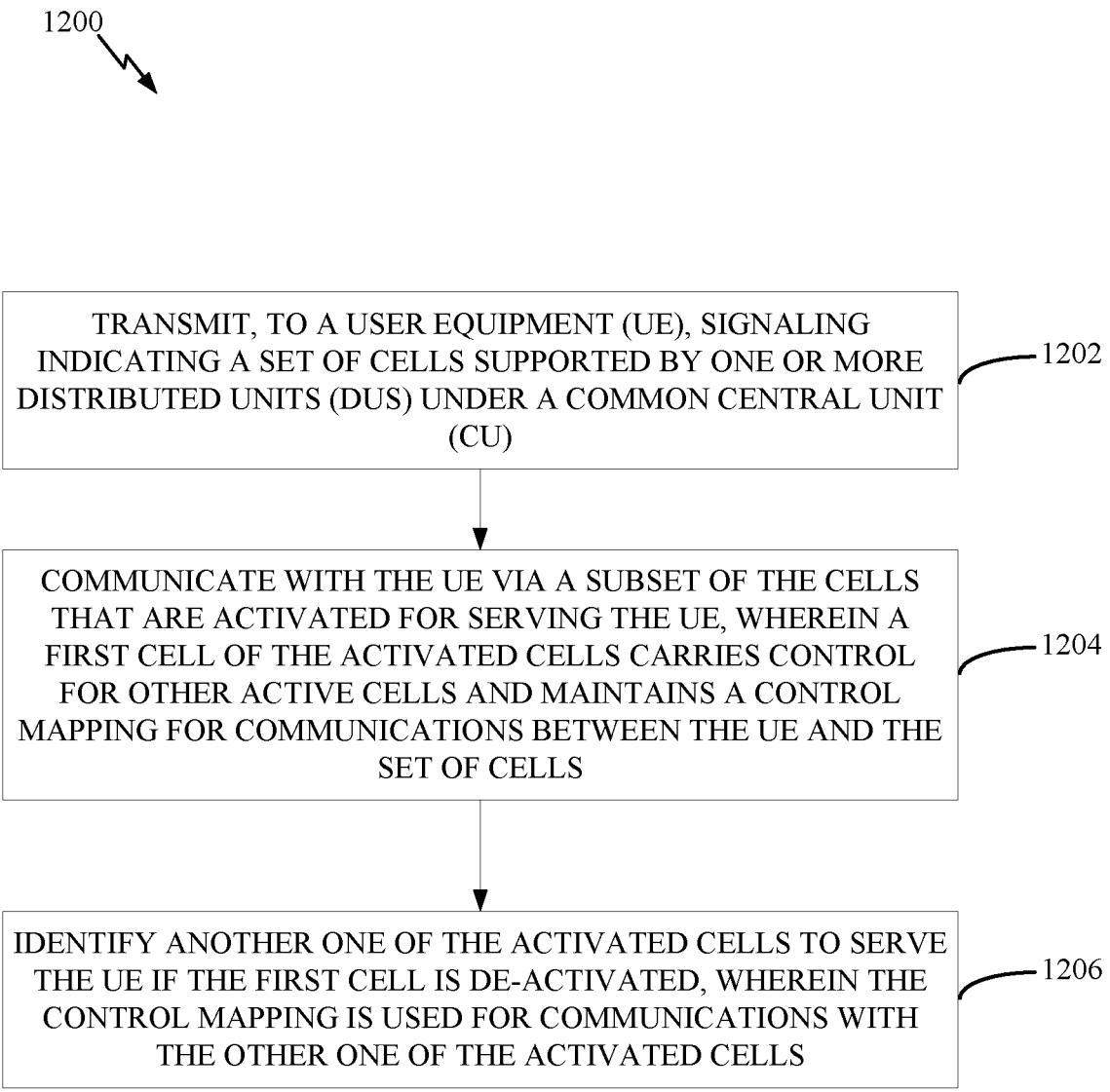
FIG. 12 illustrates example operations for wireless communication by a network entity, in accordance with some aspects of the present disclosure.

FIG. 12 illustrates example operations 1200 that may considered complementary to operations 1100 of FIG. 12. For example, operations 1200 may be performed by a network entity (e.g., a gNB DU/CU) to dynamically activate cells to support mobility of a UE (performing operations 1100 of FIG. 11).

Operations 1100 begin, at 1102, where the network entity transmits, to a user equipment (UE), an indication of a set of cells supported by one or more distributed units (DUs) under a common central unit (CU).

At 1104, the network entity communicates with the UE via a subset of the cells that are activated for serving the UE. A first cell of the activated cells may carry control for other active cells and may maintain a control mapping for communications between the UE and the set of cells.

At 1106, the network entity identifies another one of the activated cells to include in the subset of the set of cells activated to serve the UE if the first cell is deactivated. The control mapping may be used for communications with the other one of the activated cells.

Generally, if a first cell which carries control for other active cells in the activated set of cells is to be deactivated, the control mapping may be transferred to other active cells. In some aspects, resources on a newly activated cell (e.g., physical uplink control channel (PUCCH) resources) and/or other parameters may be preconfigured and made available to the UE to be used as needed (e.g., as cells are activated and deactivated). These resources may be preconfigured via, for example, radio resource control (RRC) signaling.

In some aspects, the first cell may be used for cross-cell scheduling. The other cell to include in the subset of the set of cells activated to serve the UE may be used for cross-cell scheduling after the other cell is activated and the first cell is de-activated.

In some aspects, it may be assumed that each cell manages at least some resources independently. That is, a cell may be assumed to manage its resources and may be assumed to not perform cross-cell control. However, some control may be provisioned on a cross-cell basis. For example, physical uplink control channel (PUCCH) resources may be configured and provisioned on a cross-cell basis.

In some aspects, as discussed above, the activation and de-activation of cells in the set of cells may be performed using physical (PHY) layer or medium access control (MAC) layer signaling. Control mappings may also be transferred via PHY or MAC layer signaling.

Because the cells may be supported by one or more DUs under a common CU, the cells may be part of the same gNodeB, and the radio resource control (RRC) source may remain the same regardless of which cells are included in the activated set of cells and which cells are not included in the activated set of cells. Thus, security keys (or cryptographic keys) may remain the same. After a UE is configured with the security key for the gNB, the UE need not request or be configured with other security keys in order to communicate with cells that are supported by the one or more DUs under the common CU.

In some aspects, each cell may be associated with a cell-specific security key. The UE may be pre-configured with the cell-specific security keys. When a cell is activated, the UE may communicate with the cell using the cell-specific security key associated with the activated cell.

In some aspects, PHY layer and MAC layer signaling may be security protected. To protect this signaling, one of the security keys may be used to encrypt and decrypt the signaling. The security keys used to protect the PHY layer and MAC layer signaling may be, for example, a security key associated with the gNB or a cell-specific security key associated with the cell with which the UE is communicating.

Operations 1100 and 1200 of FIGS. 11 and 12 may be described with reference to FIGS. 13A-13B which illustrate an example of UE mobility and transfer of a control mapping from one cell to another cell during UE mobility.

Figure 13A:
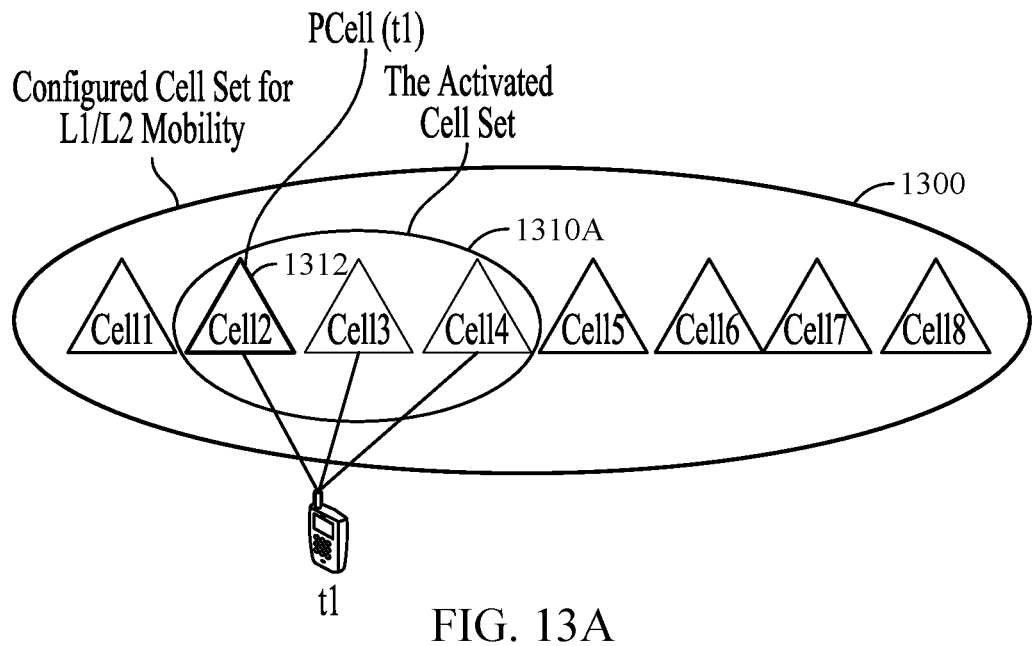
FIGS. 13A and 13B illustrate an example of UE mobility and transfer of a control mapping during mobility, in accordance with some aspects of the present disclosure.

As illustrated in FIG. 13A, in some cases, a UE may be provided with information identifying a set of activated cells. One of the cells in the activated set of cells may be designated as a PCell or otherwise designated as the cell that carries control for other active cells and maintains a control mapping for communications between the UE and the activated cell set. In the example illustrated in FIGS. 13A-13B, Cell 2 may be designated as the PCell at time t1, and Cells 3 and 4 may be designated as SCells (or otherwise may be cells for which Cell 2 maintains the control mapping and carries control information).

Figure 13B:
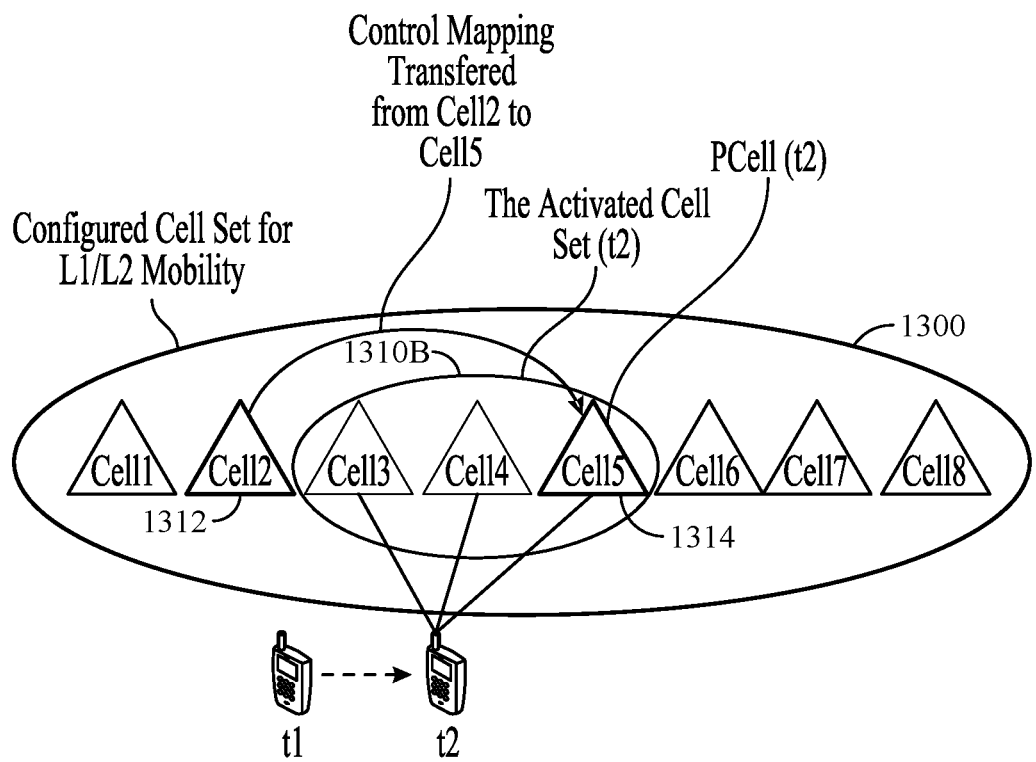

As illustrated in FIG. 13B, the UE moves to a new location at time t2. In moving to the new location at time t2, the UE and/or network entity may determine that Cell 2 is to be deactivated. Because Cell 2 currently carries control for other active cells and maintains the control mapping for communications between the UE and the activated cell set, de-activating Cell 2 may be performed after a control mapping is transferred to another cell. In this case, Cell 5 may be activated, and the UE and/or network entity may determine that Cell 5 can serve as a cell that carries control for other active cells and maintains the control mapping for communications between the UE and the activated cell set. Thus, the control mapping may be transferred from Cell 2 to Cell 5 (e.g., directly or through communications from the UE), and after the control mapping is transferred to Cell 5, Cell 2 may be de-activated and removed from the subset of cells activated for serving the UE.

Figure 14:
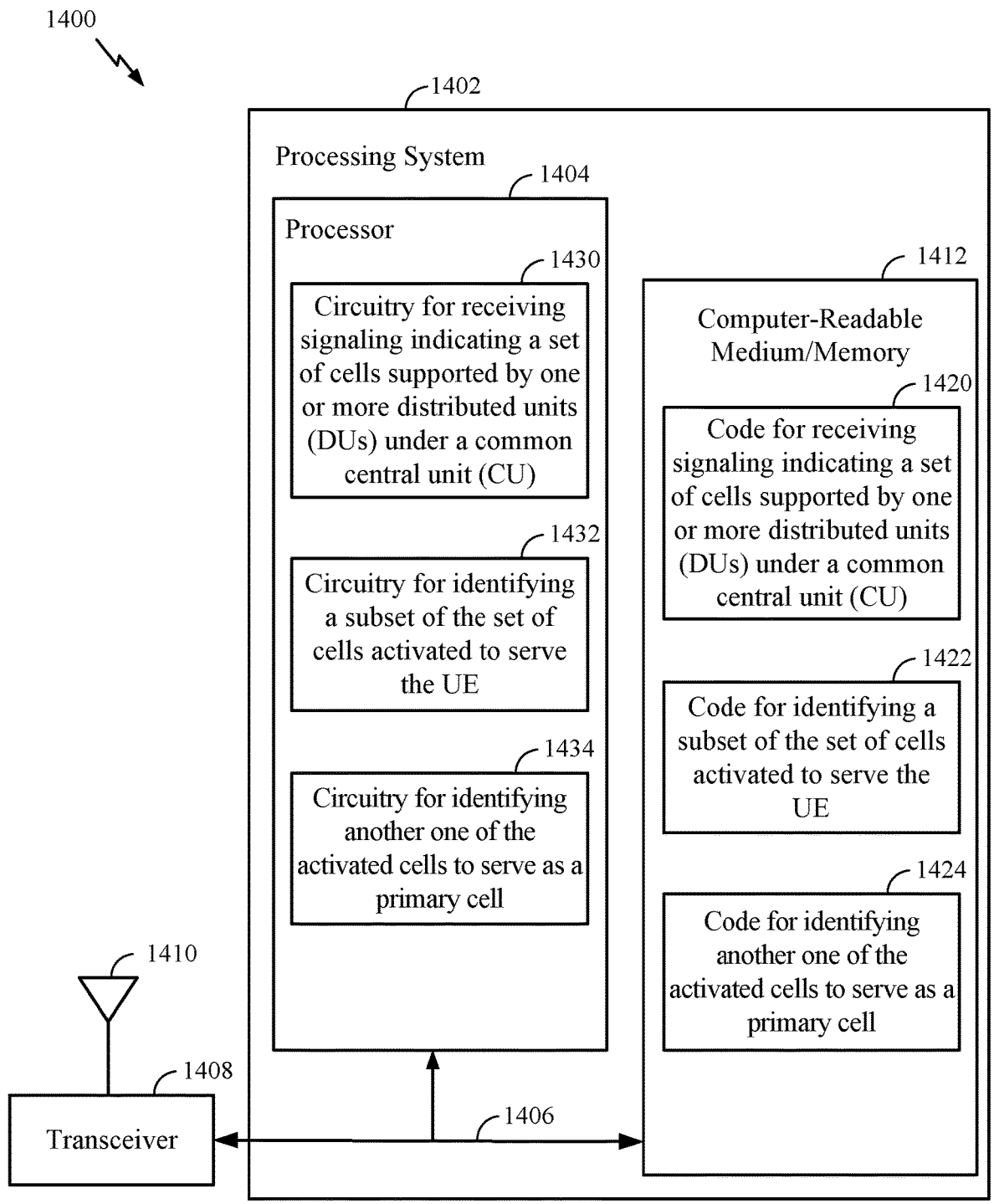
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 8. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 8, or other operations for performing the various techniques discussed herein for dynamically updating a set of cells activated to serve a UE and a cell designated as a PCell to serve the UE. In certain aspects, computer-readable medium/memory 1412 stores code 1420 for receiving signaling indicating a set of cells supported by one or more distributed units (DUs) under a common central unit (CU); code 1422 for identifying a subset of the set of cells activated to serve the UE; and code 1424 for identifying another one of the activated cells to serve as a primary cell. In certain aspects, the processor 1404 has circuitry configured to implement the code stored in the computer-readable medium/memory 1412. The processor 1404 includes circuitry 1430 for receiving signaling indicating a set of cells supported by one or more distributed units (DUs) under a common central unit (CU); circuitry 1432 for identifying a subset of the set of cells activated to serve the UE; and circuitry 1434 for identifying another one of the activated cells to serve as a primary cell.

Figure 15:
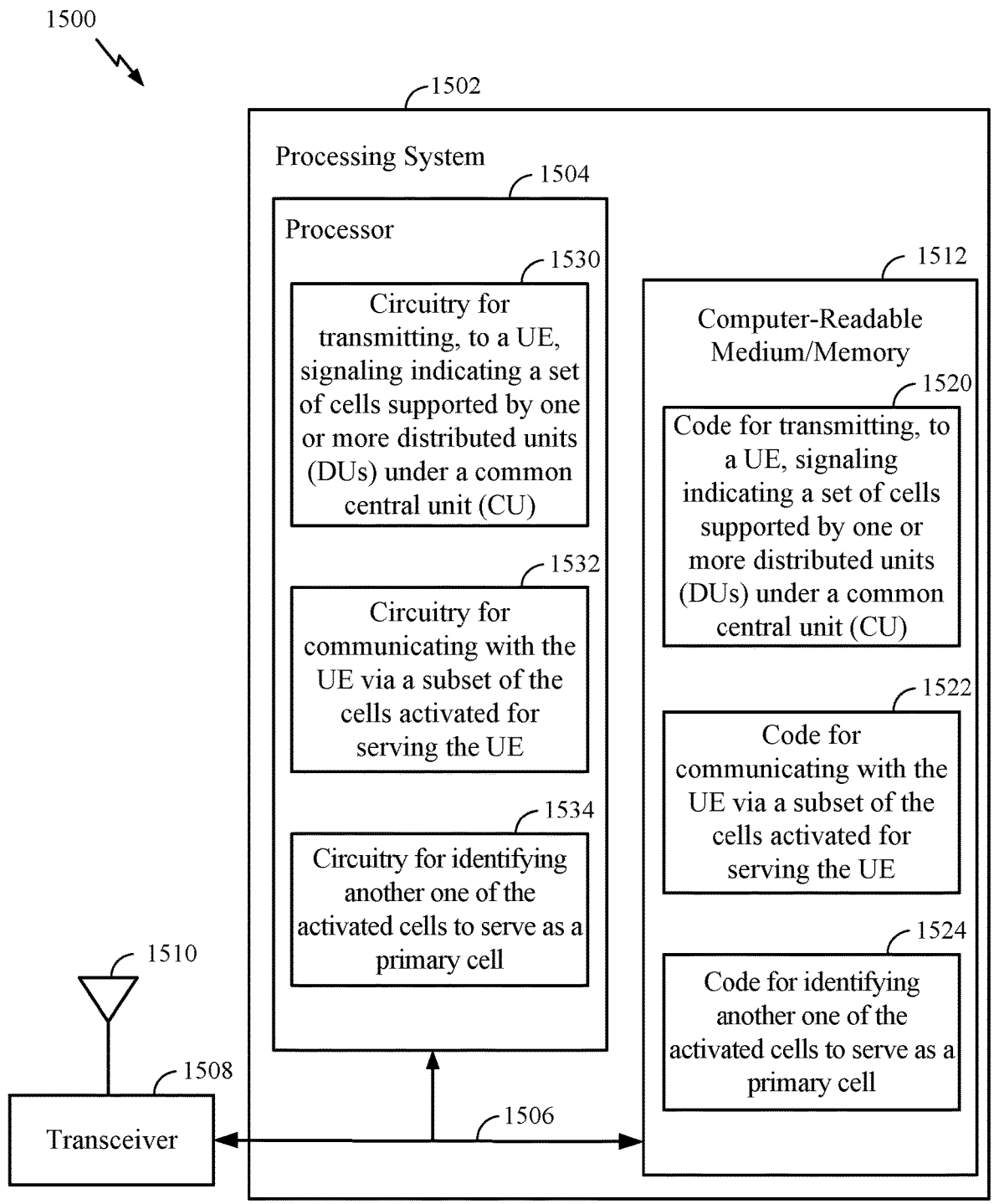
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 9. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 9, or other operations for performing the various techniques discussed herein for dynamically updating a set of cells activated to serve a UE and a cell designated as a PCell to serve the UE. In certain aspects, computer-readable medium/memory 1512 stores code 1520 for transmitting signaling indicating a set of cells supported by one or more distributed units (DUs) under a common central unit (CU); code 1522 for communicating with the UE via a subset of the cells activated to serve the UE; and code 1524 for identifying another one of the activated cells to serve as a primary cell. In certain aspects, the processor 1504 has circuitry configured to implement the code stored in the computer-readable medium/memory 1512. The processor 1504 includes circuitry 1530 for transmitting signaling indicating a set of cells supported by one or more distributed units (DUs) under a common central unit (CU); circuitry 1532 for communicating with the UE via a subset of the cells activated to serve the UE; and circuitry 1534 for identifying another one of the activated cells to serve as a primary cell.

Example Clauses

Clause 1: A method for wireless communications by a user equipment (UE), comprising: receiving signaling indicating a set of cells supported by one or more distributed units (DUs) under a common central unit (CU); identifying a subset of the set of cells activated to serve the UE, wherein a first cell of the activated cells comprises a primary cell selected from cells included in a candidate set of primary cells (PCells); and identifying another one of the activated cells to serve as the PCell if the first cell is re-designated as a secondary cell (SCell), wherein the other one of the activated cells comprises a cell selected from the candidate set of PCells.

Clause 2: The method of Clause 1, further comprising: receiving physical (PHY) layer or medium access control (MAC) layer mobility signaling indicating that the first cell is to be de-activated.

Clause 3: The method of Clause 2, wherein the mobility signaling includes an identification of a new PCell in the set of activated cells.

Clause 4: The method of any of Clauses 1 through 3, further comprising: designating the other one of the activated cells as the PCell; and designating the first cell as a secondary cell.

Clause 5: The method of Clause 4, further comprising: deactivating the first cell.

Clause 6: The method of any of Clauses 1 through 5, further comprising: receiving configuration information, from a network entity, identifying the candidate set of PCells in the set of cells, each cell in the candidate set of PCells being able to be used as the PCell if the first cell is re-designated as an SCell.

Clause 7: The method of Clause 6, wherein the configuration information further identifies a subset of the candidate set of PCells that the UE can autonomously select as the PCell if the first cell is re-designated as an SCell.

Clause 8: The method of Clauses 6 or 7, further comprising: receiving, from the network entity, an indication of a cell in the subset of the candidate set of PCells to designate as the PCell; designating the first cell as an SCell; and designating the indicated cell as the PCell.

Clause 9: The method of any of Clauses 6 through 8, wherein the configuration information is received via one of radio resource control (RRC) signaling, physical (PHY) layer signaling, or medium access control (MAC) layer signaling Clause 10: The method of any of Clauses 6 through 9, further comprising: identifying, in the subset of activated cells, a cell included in the candidate set of PCells; designating the identified cell as the PCell; and designating the first cell as a secondary cell.

Clause 11: The method of Clause 10, further comprising: deactivating the first cell.

Clause 12: The method of Clauses 10 or 11, wherein identifying the other one of the activated cells to serve as the PCell if the first cell is de-activated comprises: measuring channel quality for each cell in the candidate set of PCells; and selecting a cell in the candidate set of PCells having a highest measured channel quality as the PCell.

Clause 13: The method of Clause 12, further comprising: signaling, to the network entity, information indicating that the selected cell is designated as the PCell.

Clause 14: The method of any of Clauses 1 through 13, wherein a cell of the activated cells carries control for other activated cells and maintains a control mapping for communications between the UE and the set of cells, and the control mapping is used for communications with the identified other one of the activated cells.

Clause 15: The method of Clause 14, wherein the cell of the activated cells carrying control for the other activated cells comprises the first cell.

Clause 16: The method of Clauses 14 or 15, wherein the control mapping comprises preconfigured physical uplink control channel (PUCCH) resources for each cell in the set of cells.

Clause 17: The method of any of Clauses 14 through 16, wherein the first cell is used for cross-cell scheduling.

Clause 18: The method of any of Clauses 14 through 17, further comprising: transferring the control mapping to the other one of the activated cells via physical (PHY) layer or medium access control (MAC) layer signaling.

Clause 19: The method of Clause 18, wherein the transferring the control mapping to the other one of the activated cells is based on preconfigured parameters provided to the UE via radio resource control (RRC) signaling.

Clause 20: The method of any of Clauses 14 through 19, wherein each one of the activated cells manages at least some resources independently.

Clause 21: The method of Clause 20, wherein the first cell manages a physical uplink control channel (PUCCH) for a plurality of the activated cells.

Clause 22: The method of any of Clauses 14 through 21, wherein communications between the first cell and the UE are protected using a security cell associated with the first cell.

Clause 23: The method of Clause 22, further comprising: receiving configuration information including cell-specific security keys for each cell in the set of cells including the security key associated with the first cell and a security key associated with the other cell; and activating communications with the other cell using the security key associated with the other cell.

Clause 24: The method of Clauses 22 or 23, wherein the security key associated with the first cell is used to encrypt physical (PHY) layer or medium access control (MAC) layer signaling between the UE and the first cell.

Clause 25: A method for wireless communications by a network entity, comprising: transmitting, to a user equipment (UE), signaling indicating a set of cells supported by one or more distributed units (DUs) under a common central unit (CU); communicating with the UE via a subset of the cells that are activated for serving the UE, wherein a first cell of the activated cells is designated as a primary cell (PCell); and identifying another one of the activated cells to serve as a PCell if the first cell is re-designated as a secondary cell (SCell).

Clause 26: The method of Clause 25, further comprising: transmitting physical (PHY) layer or medium access control (MAC) layer mobility signaling indicating that the first cell is to be de-activated, wherein the mobility signaling includes an identification of a new PCell in the activated cells.

Clause 27: The method of Clauses 25 or 26, wherein identifying the other one of the activated cells to serve as the PCell comprises: receiving, from the UE, signaling identifying the other one of the activated cells designated as the PCell; and communicating with the UE using the other one of the activated cells as the PCell.

Clause 28: The method of any of Clauses 25 through 27, further comprising: transmitting, to the UE, configuration information identifying a candidate set of PCells in the set of cells, each cell in the candidate set of PCells being able to be used as the PCell if the first cell is re-designated as a secondary cell (SCell).

Clause 29: An apparatus for wireless communications, comprising: a memory; and a processor configured to perform the operations of any of Clauses 1 through 24.

Clause 30: An apparatus for wireless communications, comprising: a memory; and a processor configured to perform the operations of any of Clauses 25 through 28.

Clause 31: An apparatus for wireless communications, comprising: means for performing the operations of any of Clauses 1 through 24.

Clause 32: An apparatus for wireless communications, comprising means for performing the operations of any of Clauses 25 through 28.

Clause 33: A computer-readable medium having instructions stored thereon which, when executed by a processor, performs the operations of any of Clauses 1 through 24.

Clause 34: A computer-readable medium having instructions stored thereon which, when executed by a processor, performs the operations of any of Clauses 25 through 28.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   receiving signaling indicating a set of cells supported by one or more distributed units (DUs) under a common central unit (CU);
   identifying a subset of the set of cells activated to serve the UE, wherein a first cell of the activated cells comprises a primary cell (PCell) selected from cells included in a candidate set of PCells; and
   identifying another one of the activated cells to serve as the PCell when the first cell is re-designated as a secondary cell (SCell), wherein the other one of the activated cells comprises a cell selected from the candidate set of PCells.

2. The method of claim 1, further comprising: receiving physical (PHY) layer or medium access control (MAC) layer mobility signaling indicating that the first cell is to be de-activated, wherein the mobility signaling includes an identification of a new PCell in the set of activated cells.

3. The method of claim 1, further comprising:
   designating the other one of the activated cells as the PCell;
   designating the first cell as a secondary cell; and
   deactivating the first cell.

4. The method of claim 1, further comprising:
   receiving configuration information, from a network entity, identifying the candidate set of PCells in the set of cells, each cell in the candidate set of PCells being able to be used as the PCell when the first cell is re-designated as an SCell, and a subset of the candidate set of PCells that the UE can autonomously select as the PCell when the first cell is re-designated as an SCell.

5. The method of claim 4, further comprising:
   receiving, from the network entity, an indication of a cell in the subset of the candidate set of PCells to designate as the PCell;
   designating the first cell as an SCell; and
   designating the indicated cell as the PCell.

6. The method of claim 4, wherein the configuration information is received via one of radio resource control (RRC) signaling, physical (PHY) layer signaling, or medium access control (MAC) layer signaling.

7. The method of claim 4, further comprising:
   identifying, in the subset of activated cells, a cell included in the candidate set of PCells;
   designating the identified cell as the PCell;
   designating the first cell as a secondary cell; and
   deactivating the first cell.

8. The method of claim 7, wherein identifying the other one of the activated cells to serve as the PCell when the first cell is de-activated comprises:
   measuring channel quality for each cell in the candidate set of PCells; and
   selecting a cell in the candidate set of PCells having a highest measured channel quality as the PCell; and
   the method further comprises: signaling, to the network entity, information indicating that the selected cell is designated as the PCell.

9. The method of claim 1, wherein a cell of the activated cells carries control for other activated cells and maintains a control mapping for communications between the UE and the set of cells, and the control mapping is used for communications with the identified other one of the activated cells.

10. The method of claim 9, wherein:
    the cell of the activated cells carrying control for the other activated cells comprises the first cell,
    the control mapping comprises preconfigured physical uplink control channel (PUCCH) resources for each cell in the set of cells, and
    the first cell is used for cross-cell scheduling.

11. The method of claim 9, further comprising:
    transferring the control mapping to the other one of the activated cells via physical (PHY) layer or medium access control (MAC) layer signaling based on preconfigured parameters provided to the UE via radio resource control (RRC) signaling.

12. The method of claim 9, wherein:
    each one of the activated cells manages at least some resources independently, and
    the first cell manages a physical uplink control channel (PUCCH) for a plurality of the activated cells.

13. The method of claim 9, wherein:
    communications between the first cell and the UE are protected using a security key associated with the first cell; and the method further comprises:
  receiving configuration information including cell-specific security keys for each cell in the set of cells including the security key associated with the first cell and a security key associated with the other cell; and
  activating communications with the other cell using the security key associated with the other cell.

14. The method of claim 13, wherein the security key associated with the first cell is used to encrypt physical (PHY) layer or medium access control (MAC) layer signaling between the UE and the first cell.

15. A method for wireless communications by a network entity, comprising:
  transmitting, to a user equipment (UE), signaling indicating a set of cells supported by one or more distributed units (DUs) under a common central unit (CU);
  communicating with the UE via a subset of the cells that are activated for serving the UE, wherein a first cell of the activated cells is designated as a primary cell (PCell); and
  identifying another one of the activated cells to serve as a PCell when the first cell is re-designated as a secondary cell (SCell).

16. The method of claim 15, further comprising: transmitting physical (PHY) layer or medium access control (MAC) layer mobility signaling indicating that the first cell is to be de-activated, wherein the mobility signaling includes an identification of a new PCell in the activated cells.

17. The method of claim 15, wherein identifying the other one of the activated cells to serve as the PCell comprises:
  receiving, from the UE, signaling identifying the other one of the activated cells designated as the PCell; and
  communicating with the UE using the other one of the activated cells as the PCell.

18. The method of claim 15, further comprising:
  transmitting, to the UE, configuration information identifying a candidate set of PCells in the set of cells, each cell in the candidate set of PCells being able to be used as the PCell when the first cell is re-designated as a secondary cell (SCell).

19. An apparatus, comprising:
  a computer-readable medium having executable instructions stored thereon; and
  a processor configured to execute the executable instructions to cause the apparatus to:
    receive signaling indicating a set of cells supported by one or more distributed units (DUs) under a common central unit (CU);
    identify a subset of the set of cells activated to serve the UE, wherein a first cell of the activated cells comprises a primary cell (PCell) selected from cells included in a candidate set of PCells); and
    identify another one of the activated cells to serve as the PCell when the first cell is re-designated as a secondary cell (SCell), wherein the other one of the activated cells comprises a cell selected from the candidate set of PCells.

20. The apparatus of claim 19, wherein the processor is further configured to cause the apparatus to:
  receive physical (PHY) layer or medium access control (MAC) layer mobility signaling indicating that the first cell is to be de-activated, wherein the mobility signaling includes an identification of a new PCell in the set of activated cells.

21. The apparatus of claim 19, wherein the processor is further configured to cause the apparatus to:

designate the other one of the activated cells as the PCell;
designate the first cell as a secondary cell; and
deactivate the first cell.

22. The apparatus of claim 19, wherein the processor is further configured to cause the apparatus to:
  receive configuration information, from a network entity, identifying the candidate set of PCells in the set of cells, each cell in the candidate set of PCells being able to be used as the PCell when the first cell is re-designated as an SCell, and a subset of the candidate set of PCells that the UE can autonomously select as the PCell when the first cell is re-designated as an SCell.

23. The apparatus of claim 22, wherein the processor is further configured to cause the apparatus to:
  identify, in the subset of activated cells, a cell included in the candidate set of PCells;
  designate the identified cell as the PCell;
  designate the first cell as a secondary cell; and
  deactivate the first cell.

24. The apparatus of claim 23, wherein:
  in order to identify, in the subset of activated cells, the cell included in the candidate set of PCells, the processor is configured to cause the apparatus to:
    measure channel quality for each cell in the candidate set of PCells; and
    select a cell in the candidate set of PCells having a highest measured channel quality as the PCell; and
  the processor is further configured to cause the apparatus to: signal, to the network entity, information indicating that the selected cell is designated as the PCell.

25. The apparatus of claim 19, wherein a cell of the activated cells carries control for other activated cells and maintains a control mapping for communications between the UE and the set of cells, and the control mapping is used for communications with the identified other one of the activated cells.

26. The apparatus of claim 25, wherein the processor is further configured to cause the apparatus to:
  transfer the control mapping to the other one of the activated cells via physical (PHY) layer or medium access control (MAC) layer signaling based on preconfigured parameters provided to the UE via radio resource control (RRC) signaling.

27. The apparatus of claim 25, wherein:
  communications between the first cell and the UE are protected using a security key associated with the first cell; and
  the processor is further configured to cause the apparatus to:
    receive configuration information including cell-specific security keys for each cell in the set of cells including the security key associated with the first cell and a security key associated with the other cell; and
    activate communications with the other cell using the security key associated with the other cell.

28. The apparatus of claim 27, wherein the security key associated with the first cell is used to encrypt physical (PHY) layer or medium access control (MAC) layer signaling between the UE and the first cell.

29. An apparatus, comprising:
  a computer-readable medium having executable instructions stored thereon; and
  a processor configured to execute the executable instructions to cause the apparatus to:

transmit, to a user equipment (UE), signaling indicating a set of cells supported by one or more distributed units (DUs) under a common central unit (CU);

communicate with the UE via a subset of the cells that are activated for serving the UE, wherein a first cell of the activated cells is designated as a primary cell (PCell); and identify another one of the activated cells to serve as a PCell when the first cell is re-designated as a secondary cell (SCell).

30. The apparatus of claim 29, wherein in order to identify another one of the activated cells to serve as a PCell when the first cell is re-designated as an SCell, the processor is configured to cause the apparatus to:

receive, from the UE, signaling identifying the other one of the activated cells designated as the PCell; and communicate with the UE using the other one of the activated cells as the PCell.

* * * * *